United States Patent [19]
Chesack et al.

[11] Patent Number: 5,941,057
[45] Date of Patent: Aug. 24, 1999

[54] ATTACHMENT ARRANGEMENT FOR MOWER REEL DRIVE

[75] Inventors: Gregory J. Chesack, Kenosha; Jeffrey M. Arendt, Union Grove, both of Wis.

[73] Assignee: Textron Inc., Providence, R.I.

[21] Appl. No.: 08/986,452

[22] Filed: Dec. 8, 1997

[51] Int. Cl.⁶ ................................................. A01D 34/53
[52] U.S. Cl. .................................................... 56/249; 56/7
[58] Field of Search ............................. 56/7, 249, 249.5, 56/294, 253, 254; 403/344, 373

[56] References Cited

U.S. PATENT DOCUMENTS

| | | | |
|---|---|---|---|
| 2,372,300 | 3/1945 | Speiser | 56/249.5 |
| 5,170,613 | 12/1992 | Heise et al. | 56/249 |
| 5,291,724 | 3/1994 | Cotton | 56/7 X |
| 5,412,932 | 5/1995 | Schueler | 56/249 |
| 5,477,666 | 12/1995 | Cotton | 56/294 X |
| 5,822,965 | 10/1998 | Chesack et al. | 56/249 |

*Primary Examiner*—Victor Batson
*Attorney, Agent, or Firm*—Arthur J. Hansmann

[57] ABSTRACT

An attachment arrangement and method for mower reel drive wherein the rotating reel has its shaft rotatably mounted on a mower frame, and a rotational drive motor is also mounted on the frame. The facility of making the connection between the motor and the frame and of aligning the parts along a longitudinal axis for the drive relationship, are both involved, and pin connections are employed to achieve those objectives.

12 Claims, 4 Drawing Sheets

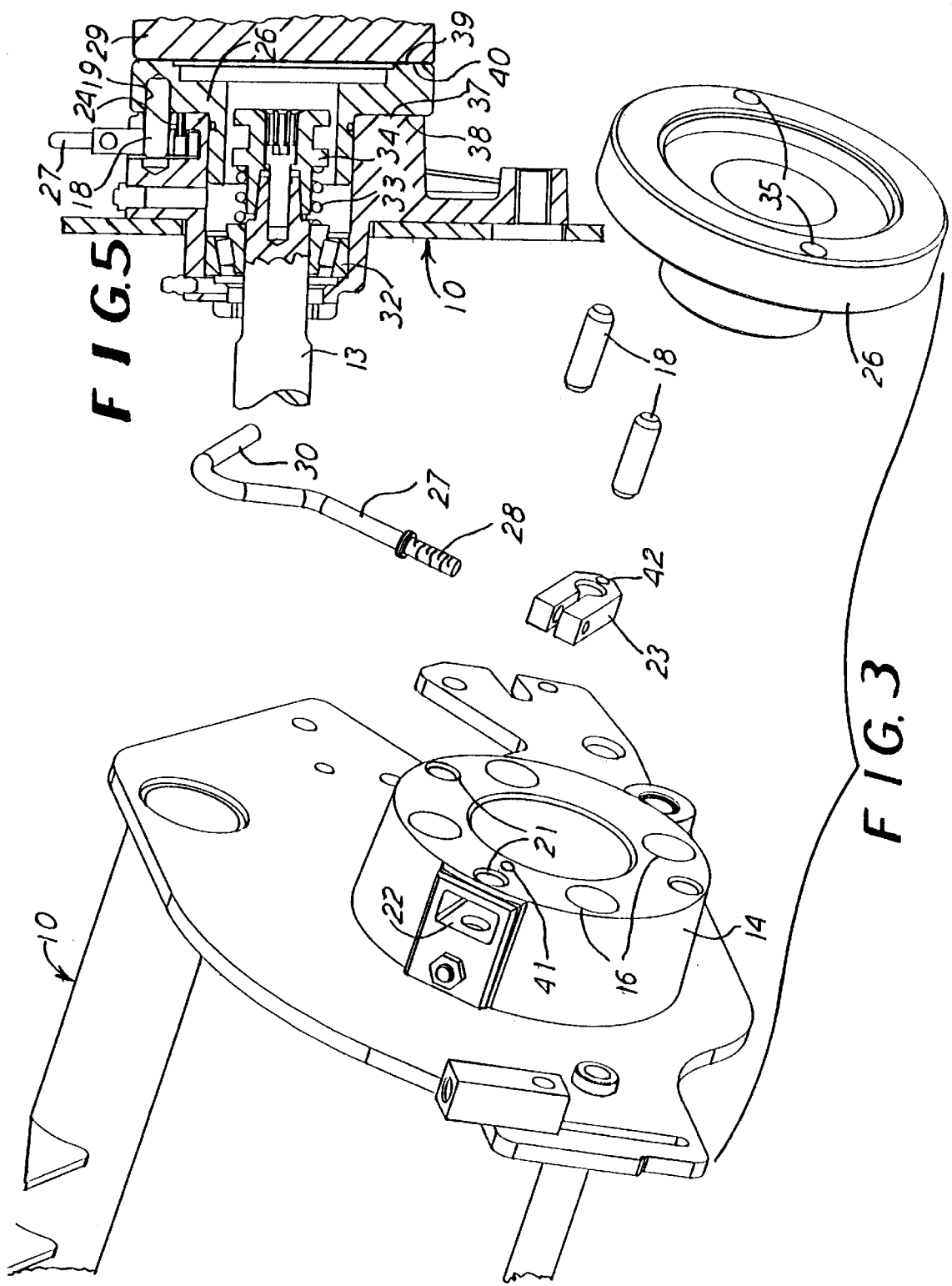

ATTACHMENT ARRANGEMENT FOR MOWER REEL DRIVE

This invention relates to an attachment arrangement for a lawn mower reel drive and, more specifically, it relates to an assembly of parts for supporting and rotationally driving the mower reel on the frame of the reel mowers.

BACKGROUND OF THE INVENTION

Various arrangements are already known in the prior art wherein they pertain to driving mower reels by driving motors. The reel and motor are suitably supported on the mower frame, and, in actuality, the motor can be supported at either end of the reel shaft, according to desired selection.

In one condition, the parts involved in the final assembly may be shipped in disassembled condition, and it is then necessary to make the assembly at the location of using the mower. In that regard, it is desirable to have the assembly made quickly and easily, and also to select either side of the reel for the location of the motor, and, in that instance, there can also be a counterweight on the assembly and in the location opposite the motor.

In accomplishing these objectives, it is also desirable that the parts be assembled in secure relation to each other, and that they also be readily disassembled for repair or exchange of positions, as necessary or desired.

Still further, it is an object of this invention to provide an arrangement of a motor and reel mounted on a reel frame and wherein the motor is in a precise aligned position relative to the longitudinal axis of the reel, all to assure that the drive from the motor to the reel shaft is aligned and therefore with minimal wear and possible damage to the driving parts.

In achieving these objectives, the present invention employs pin connections between the various parts, rather than employing exclusively threaded bolts or screws, and thus the desired precise radial alignment of the driving parts is accomplished with this invention.

BRIEF DESCRIPTION OF THE DRAWINGS

FIG. 3 is an enlarged perspective view similar to the right end of FIG. 2.

FIG. 4 is a perspective view of the clamp of this invention.

FIG. 5 is a longitudinal sectional view of a portion of the parts of FIG. 1, and showing the mower reel shaft and the drive connection thereto.

DETAILED DESCRIPTION OF THE EMBODIMENT AND METHOD

Figure 1:
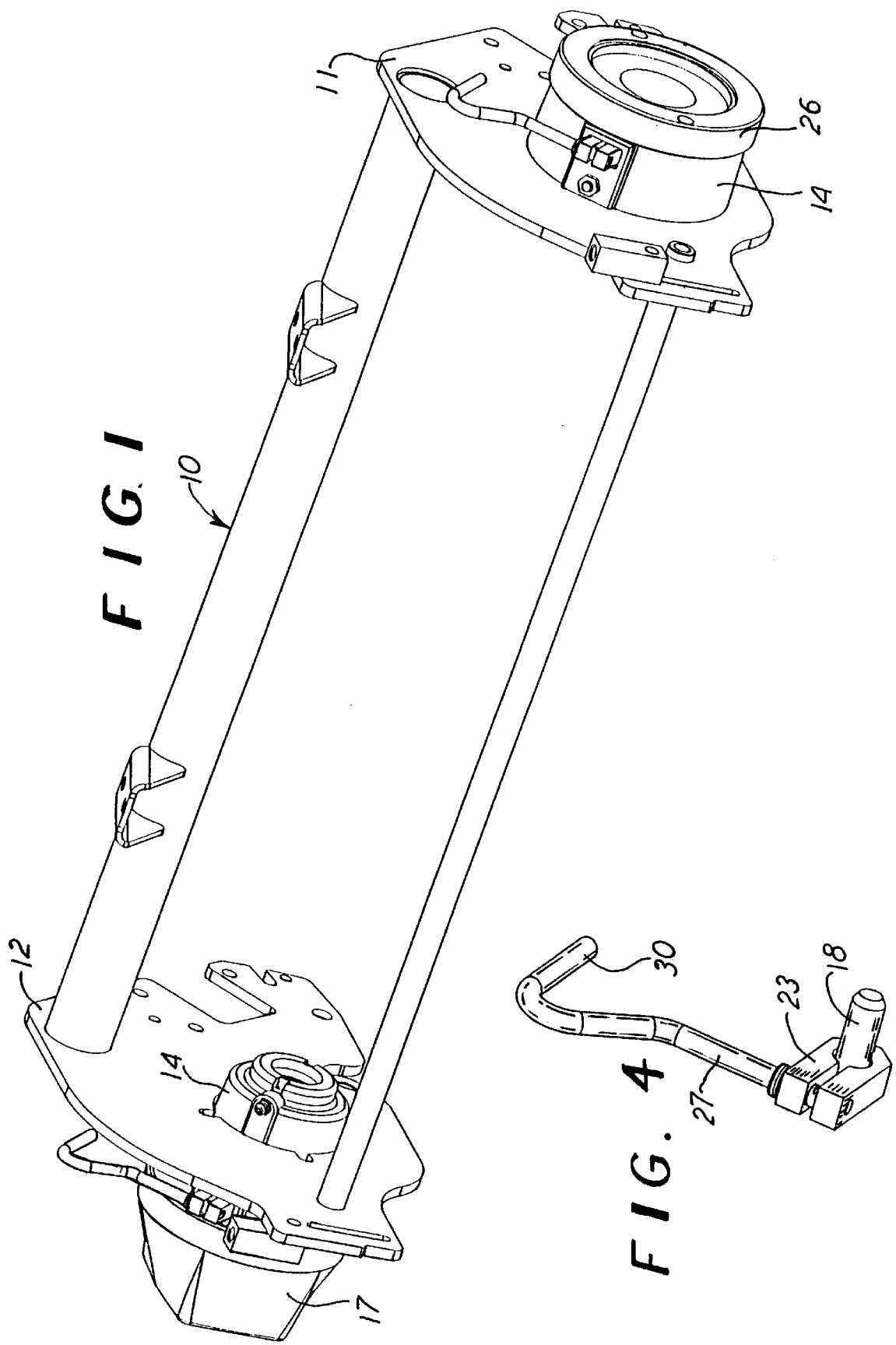
FIG. 1 is a front perspective view of a portion of a reel mower with parts of this invention shown therewith.

A reel type lawn mower is shown in regard to its frame 10, with frame sides 11 and 12 and with a reel cylindrical shaft 13, all of a conventional nature such as shown in U.S. Pat. No. 5,412,932 which disclosure is incorporated herein and which shows the mower reel and frame and also shows the driving motor and the connection with the reel.

Side frames 11 and 12 are uprightly disposed and they each respectively support a bearing housing 14 which is suitably attached to the respective frame sides 11 and 12, such as by bolting. FIG. 3 shows bearing housing bolt holes, such as holes 16 which extend through the bearing housing and align with holes in the side plates for bolting to the side plates 11 and 12, in a conventional arrangement. Of course the bearing housings 14 support unshown bearings for rotatable support of the reel shaft 13, again, in a conventional arrangement including that shown in U.S. patent application Ser. No. 08/922,015 filed Sep. 2, 1997 and whose disclosure is incorporated herein.

With the two bearing housings 14 conventionally mounted on the reel frame 10, and with the housings 14 presenting a longitudinal axis extending therebetween and which axis is coincident with the longitudinal axis of the shaft 13, the invention provides for a mounting of parts on the respective bearing housings 14 for supporting the driving motor on one end of the shaft 13 and a counterweight on the other end of the shaft 13.

Figure 2:
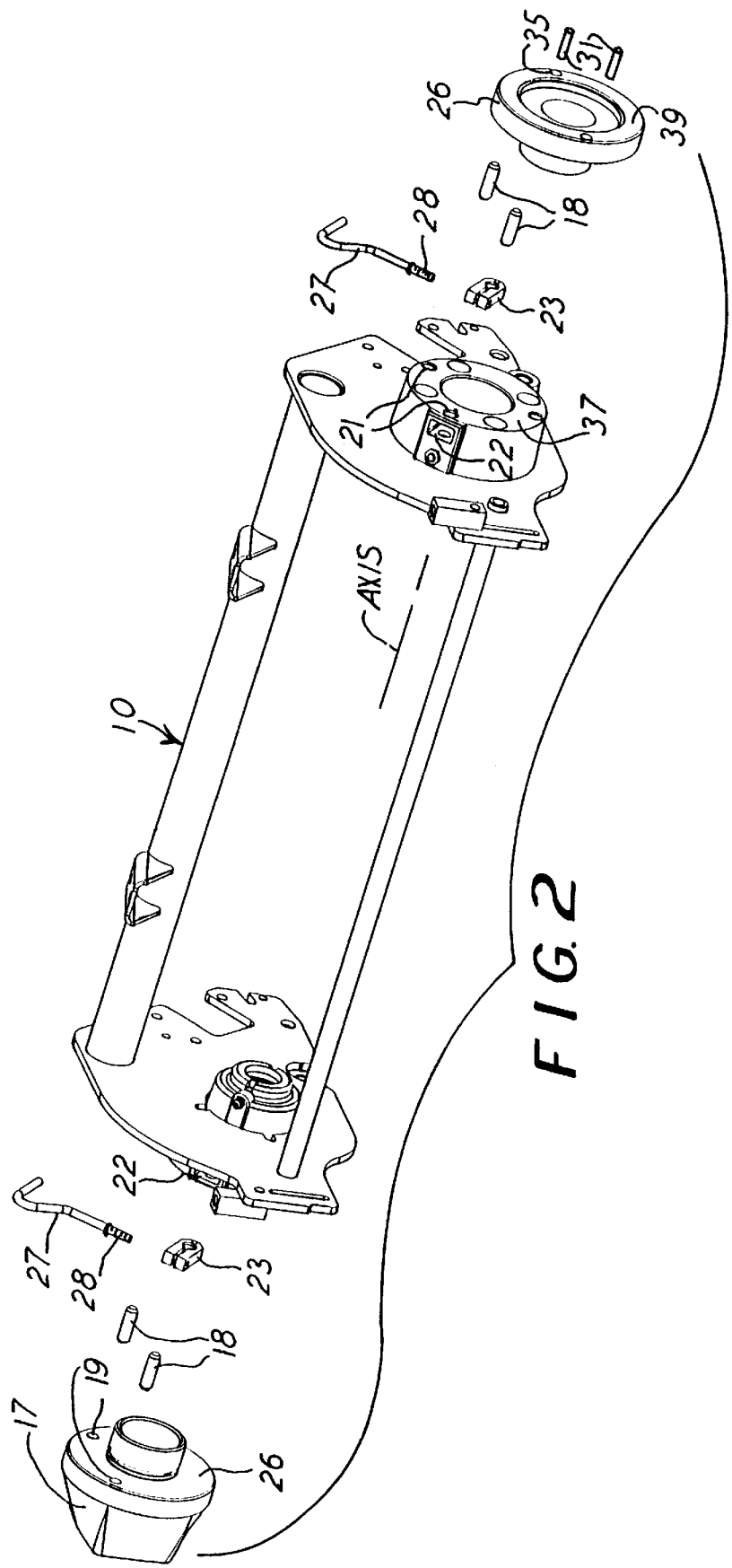
FIG. 2 is a perspective view similar to FIG. 1, but with the parts shown in the separated respective positions.

FIG. 2 shows a counterweight 17 near the mower frame 10 to be mounted directly to one bearing housing 14. The pins 18 are pressed into the openings 19 in the counterweight, and the pins 18 also fit into openings 21 in the bearing housing, and thus the counterweight 17 is aligned with and supported close to the bearing housing 14.

The bearing housings 14 have a recess or opening 22 extending therein, and a U-shaped clamp 23 is disposed in each opening 22. FIG. 5 shows a pin 24 which extends through each clamp 23 and through the bearing housings 14 to stabilize the clamps 23 on the bearing housings 14 and in the openings 22.

The pins 18 are pressed into the counterweight 17, and the clamp 23 engages one of the pins 18. By means of a screw or threaded handle 27, having a threaded end 28 which extends into the clamp 23, the clamp 23 can be tightened onto the one pin 18 and thus secure the pin 18 and therefore the attached counterweight 17 relative to the respective bearing housing 14.

With that arrangement, the method and assembly are readily established and are secure, and the counterweight 17 is properly aligned radially of the bearing housing 14 and thus also to the reel shaft 13.

As further seen in FIG. 2, there is an adapter 26 which has two of the press pins 18 affixed thereto so the adapter 26 can be affixed to the other bearing housing 14 by those two press pins 18. Then a driving motor 29 shown in FIG. 6, can be screwed onto the adapter 26 by means of two screws 31 which extend into the motor 29 and into the adapter screw holes 35. Again, the motor 29 is therefore radially aligned by means of the screws 31 so that its longitudinal axis is coincident with the longitudinal axis of the reel shaft 13.

Figure 6:
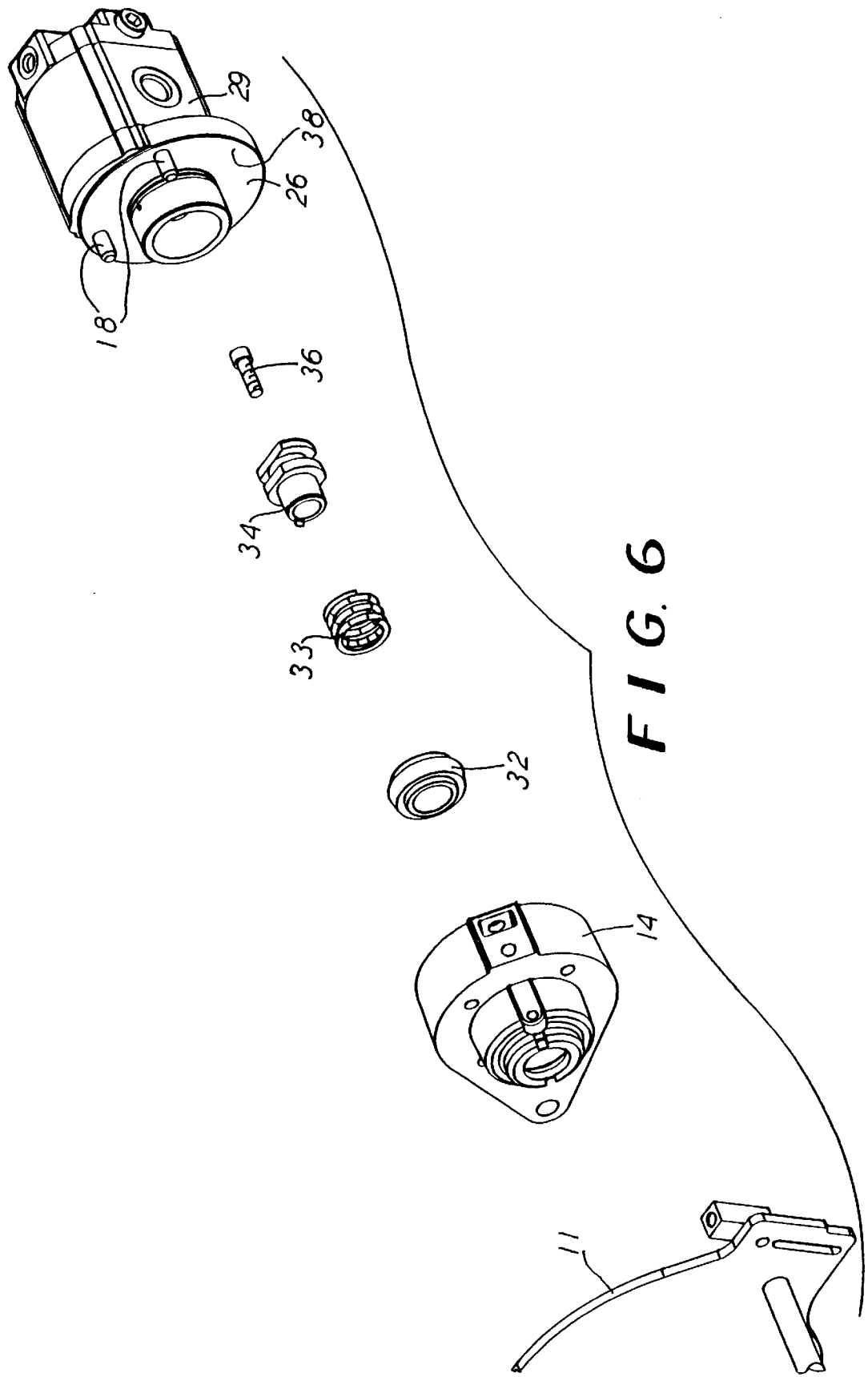
FIG. 6 is an exploded perspective view of one end of the assembly.

FIG. 6 also shows the reel shaft support bearing 32 and a compression spring 33 acting thereon, and there is a drive sleeve 34 which transfers the rotational drive from the motor 29 to the shaft 13, and there is also a screw 36 which holds the aforementioned parts inside the bearing housing 14.

Thus, on the motor end, there can be the adapter 26 affixed to its bearing housing 14 by means of the press pins 18, with one of the pins 18 being engaged by its clamp 23 which is tightened by means of the clamp handle 27, as described. Also, the adapter 26 can be eliminated, and, like with the counterweight 17, the motor 29 can be directly mounted on the respective bearing 14 without any adapter therebetween, and that mounting would simply be by having the pins 18 pressed directly into the motor 29 in suitable pin holes therein as described with the shown adapter 26.

Accordingly, the disclosure is of the arrangement and assembly of the various parts, and the method of achieving the desired results, by means of having the bearing housings mounted on the frame and then having the respective counterweight 17 and the motor 29 affixed to the bearing housings 14 by means of the clamps 23 which engage the inserted press pins 18.

Whether or not the adapter 26 is included, there are planar surfaces interfaced between the assembled parts such that the bearing housings have a surface 37 which is planar and flush with a surface 38 on the adapter 26. The motor has a planar surface 40 which is shown to be against the nearby adapter surface 39. Also, without adapter 26, surfaces 37 and 40 could be in contact. The parts are telescoped together, as shown.

The motor is of the type which can rotate in both directions, so it can be positioned on either end of the reel shaft for forward drive of the shaft. Also, the method and assembly can be accurately and quickly accomplished.

The bearing housing openings 22 and one of the openings 21 intersect each other inside the housings 14. The pins 24 are positioned into the housings in openings 41 and into clamps 23 in openings 42, and pins 24 are tight relative to the housings. Of course the clamps 23 intersect the one opening 21, and the pins 24 and one of the pins 18 are positioned after the clamp 23 is in its assembled position. The handles 27 have a right-angle offset grip 30 for torquing the handles onto the clamps 23.

So pins 18 are press-fitted in the assembly between the bearing housings and the adapter 26 and the counterweight and the motor to secure all together. However, where the adapter 26 is not employed, then there would be suitable holes for press pins 18 in the motor 29 for directly connecting the motor onto the housing 14. Clamp 23 would then axially secure the motor relative to its bearing housing. The clamps 23 have a threaded opening 43 for threadedly receiving the threaded end 28 of the handle 27. Also, there is a clamp opening 44 for free movement of the handle therein, and there is a flange 46 affixed on the handle 27 for forcing the clamp to a closed position when tightening onto the trapped one pin 18. The clamps 23 are then stable on the bearing housings, and they are U-shaped spring material clamps.

The arrangement is such that the pins 18 are in symmetrical positions relative to a vertical plane, and thus the motor and counterweight can be interchangeably mounted on opposite ends relative to the reel shaft.

What is claimed is:

1. An attachment arrangement for rotationally driving a reel of a mower comprising:

a mower reel shaft, a reel frame for rotatably supporting said shaft, a bearing housing having a longitudinal axis and having a central opening extending along said longitudinal axis and said bearing housing being mounted on said frame, an adapter having a protrusion extending snugly into said central opening, a pin fixed with and extending from said adapter and into said bearing housing, said bearing housing having an opening therein extending radially of said longitudinal axis and being in intersection with said pin, a clamp located in said radial opening and being releasably engagable with said pin for clamping said pin upon tightening said clamp, a threaded member on said clamp for tightening said clamp and thereby releasably holding said adapter onto said bearing housing, and a motor attached to said adapter and being in an operatively driving relationship with said shaft.

2. An attachment arrangement for rotationally driving a reel of a mower comprising:

a mower reel shaft, a reel frame for rotatably supporting said shaft, a bearing housing having a longitudinal axis and said bearing housing being mounted on said frame and rotatably supporting said shaft, a motor for drivingly rotating said shaft, a pin interconnected with said motor and extending to said bearing housing, a releasable clamp located on said bearing housing and being releasably engagable with said pin for clamping said pin upon tightening said clamp, and a threaded member engageable with said clamp for tightening said clamp and thereby releasably holding said motor on said bearing housing and with said motor being in an operatively driving relationship with said shaft.

3. The attachment arrangement as claimed in claim 2, including an additional pin extending intermediate said bearing housing and said motor and extending parallel to said longitudinal axis and being operatively arranged for aligning said motor radially on said bearing housing.

4. The attachment arrangement as claimed in claim 2, wherein said pin extends parallel to said longitudinal axis.

5. The attachment arrangement as claimed in claim 2, including said reel frame having two oppositely disposed first and second side frame portions, said bearing housing and said motor being attached to said first side frame portion, an additional bearing housing being attached to said second side frame portion and rotatably supporting said reel shaft, a counterweight positioned adjacent said additional bearing housing, an additional pin affixed to said counterweight and extending parallel to said longitudinal axis, an additional releasable clamp located on said additional bearing housing and being releasably engaged with said additional pin for clamping said additional pin upon tightening said additional clamp, and an additional threaded member engageable with said additional clamp for tightening said additional clamp and thereby releasably holding said counterweight on said additional bearing housing.

6. An attachment arrangement for rotationally driving a lawn mower reel having a reel shaft comprising:

a mower frame having two side portions, a first and a second bearing housing respectively mounted on said portions, the lawn mower reel having a shaft adapted to be rotatably supported on said bearing housings, a motor adapted to be operatively connected with said shaft for rotatably driving said shaft, a motor connection pin connected to said motor for fixedly securing said motor to said first bearing housing, and a first clamp located on said first bearing housing and releasably engaged with said motor connection pin for releasably attaching said motor to said first bearing housing.

7. The attachment arrangement as claimed in claim 6, including
   a counterweight,
   a counterweight connection pin connected to said counterweight for fixedly securing said counterweight to said second bearing housing, and
   a second clamp located on said second bearing housing capable of being releasably engaged to said counterweight connection pin for releasably attaching said counterweight to said second bearing housing.

8. The attachment arrangement as claimed in claim 6, including
   a handle engaging said clamp for threadedly closing and opening said clamp.

9. The attachment arrangement as claimed in claim 6, including
   said shaft and said first and second bearing housings and said motor all having a longitudinal axis, and
   additional pins extending between said bearing housing and said motor for alignment of said motor longitudinal axis relative to said bearing housing longitudinal axis.

10. The attachment arrangement as claimed in claim 6, including,
    an additional pin extending through said first bearing housing and said clamp for releasably affixing said clamp to said first bearing housing.

11. A method of attaching a motor to a mower shaft bearing housing for rotationally driving the reel of a mower comprising the steps of
    securing a bearing housing on a frame of a reel mower for rotational support of said reel about its longitudinal axis of cutting rotation,
    positioning a driving motor along said longitudinal axis and providing a pin between said bearing housing and said motor for securing said motor to said bearing housing, and
    mounting a clamp onto said bearing housing for releasably clamping onto said pin and thereby secure said motor to said bearing housing.

12. The method as claimed in claim 11, including
    positioning an additional bearing housing and a counterweight along said axis and providing an additional pin between said additional bearing housing and said counterweight,
    mounting an additional clamp onto said additional bearing housing for releasably clamping onto said additional pin and thereby secure said counterweight to said additional bearing housing, and
    making said securing pins and said clamps and their configurations respectively identical, all for mounting said motor and said counterweight on either said bearing housing or said additional bearing housing.

* * * * *